United States Patent

[11] 3,621,874

[72] Inventors Richard C. Murphy
 Hickory Hills;
 Balakrishnan R. Nair, Evanston, both of Ill.
[21] Appl. No. 64,544
[22] Filed Aug. 17, 1970
[45] Patented Nov. 23, 1971
[73] Assignee The United States of America as represented by the United States Atomic Energy Commission

[54] LIFT-TYPE CHECK VALVE
 12 Claims, 4 Drawing Figs.
[52] U.S. Cl. ...................................... 137/512.1,
 137/512.2
[51] Int. Cl. ...................................... F16k 17/10
[50] Field of Search ........................................... 137/512.1,
 512.2, 512.3, 513

[56] References Cited
UNITED STATES PATENTS
3,419,113  12/1968  Shelley .......................... 137/512.2
3,540,469  11/1970  Ward ............................. 137/512.2

Primary Examiner—Herbert F. Ross
Assistant Examiner—William H. Wright
Attorney—George S. Schwind ABSTRACT: A phased closure check valve having a primary closure means and a secondary closure means positioned on the primary means, both of which are conical and are mounted on a common shaft. Upon reversal of flow, the primary means is seated to thereby throttle the reverse flow through the valve. The secondary means, which is spring biased to retard closing, is subsequently closed by the throttled flow to completely close the valve in a manner which substantially reduces the pressure rise in the piping system since the reversed fluid velocity is decreased in stages.

PATENTED NOV 23 1971 3,621,874

LIFT-TYPE CHECK VALVE

BACKGROUND OF THE INVENTION

Check valves, which are used to prevent reverse flow in piping systems, are well known. Reverse flow can occur when a pump in the system fails and the ensuing loss of pump pressure causes the fluid in the piping system to flow back into the pump. A certain amount of velocity pressure is the force required to keep a valve disc open. Between this amount and zero there will be a partial closing situation which is ideal when the valve seats at a zero velocity of forward flow. By the placement of a proper check valve on the delivery or outlet of the pump, a decrease of flow caused by loss of pump pressure actuates the check valve, causing it to close thereby preventing such undesirable reverse flow.

Since check valves require a certain amount of time to completely close following pump failure, reverse flow is initiated during this time. The rate of increase of the reverse flow velocity depends on the particular piping system, and, the velocity could build up to a value such that the instantaneous stoppage of reverse flow caused by the abrupt complete closing of the check valve would cause a dangerous rise in pressure. This pressure rise is propagated through the entire piping system in the form of shock waves which can cause considerable damage to the system.

Most present check valve designs employ special devices to limit reverse flow velocity through the valve at the instant of closure, in order to minimize the rise in pressure following complete closing of the valve. They include counterweights, hydraulic dashpots or snubbers, powerful springs, or combinations thereof. Counterweights and torsion springs are used with hinged disc check valves and serve the purpose of speeding the disc towards the seat before the reverse flow velocity has time to build up to a large value. Compression springs are used in lift-type check valves for the same purpose. Dashpots are generally used to slow down the disc during the final phase of its travel towards the seat. The slowing of the disc by the dashpot helps to throttle the reverse flow so that it attains a small value at the instant the valve closes completely.

The phased closure check valve, which is a two-stage check valve, as described herein and by virtue of its novel design, minimizes the pressure buildup normally accompanying complete closing of the conventional check valves. It has been found to be highly desirable to provide a phased closure check valve having a primary and secondary closure means which are coaxial and the phased closing of which substantially reduces the pressure rise in piping systems when reverse flow occurs. A primary advantage of a phased closure check valve is that is requires no dashpots or counterweights to minimize pressure surge effects.

Also, even though the phased closure check valve employs a small compression spring, this spring is not stressed except when the valve closes. This is an advantage over other check valves employing torsion and compression springs that are stressed when the valves are in the open position. Since any check valve is expected to function in the open position during most of its lifetime, springs that are stressed when the valve is open can weaken faster and be detrimental to the performance of the valve.

The instant valve may be used in both vertical and horizontal installations, although vertical installations have an added advantage in that the weight of the closure means assists closing. Also, the valve has applications in nuclear reactors or other high temperature services, since its symmetrical design minimizes thermal distortion.

OBJECTS OF THE INVENTION

It is a principal object of the present invention to provide an improved phased closure check valve which minimizes the pressure buildup following complete closing of the valve.

A further object is to provide a phased closure check valve having a primary closure means, which is closed by the initiation of reverse flow to thereby throttle the reversed fluid, and complete closing is subsequently effected by closing a secondary closure means.

In accordance with the invention, a phased check valve is comprised of a tubular body having a fixed valve seat positioned transversely within the body and a primary closure means, which is axially slideable, adapted to cooperate with said seat. The primary closure means has a shaft extending from each side thereof which is centrally journaled at each end of the body. A secondary closure means, the latter of which is positioned for axial movement along said shaft means and is spring urged to retard its closing. Reverse fluid flow through the valve causes the primary closure means to axially move to its seated position to thereby throttle the reverse flow through the valve. The secondary closure means, which has a spring means opposing closing, is subsequently closed to completely block all reverse flow through the check valve in a phased sequence which substantially reduces pressure rise and possible damage to the piping system.

Further objects, features and advantages of the invention will be apparent with reference to the following specifications and accompanying drawings of the preferred embodiment.

IN THE DRAWING

DESCRIPTION OF THE INVENTION

Figure 4:
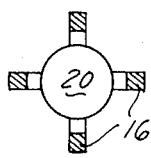
Figure 2:
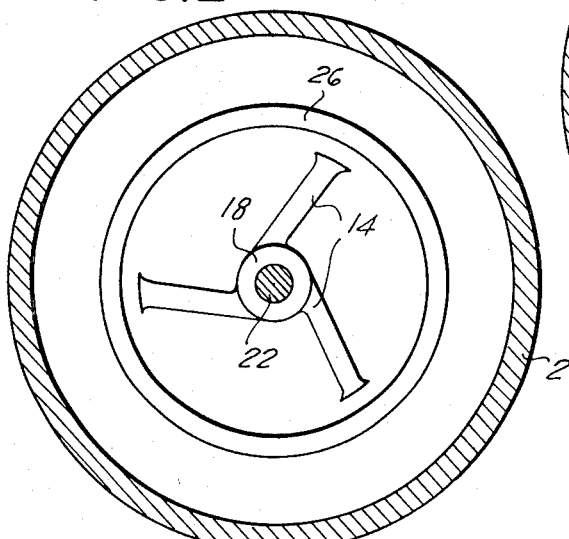
FIG. 2 is a transverse cross-sectional view of the valve taken on line 2—2 of FIG. 1.
Figure 3:
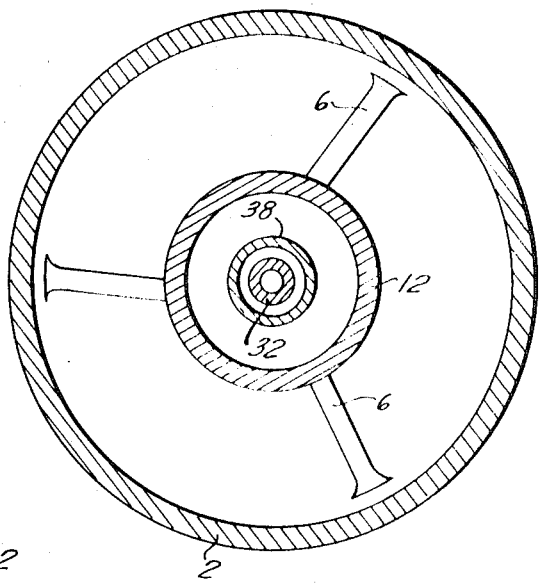
FIG. 3 is a transverse cross-sectional view of the valve taken on line 3—3 of FIG. 1; and, FIG. 4 is a partial transverse cross-sectional view of the valve taken on line 4—4 of FIG. 1.
Figure 1:
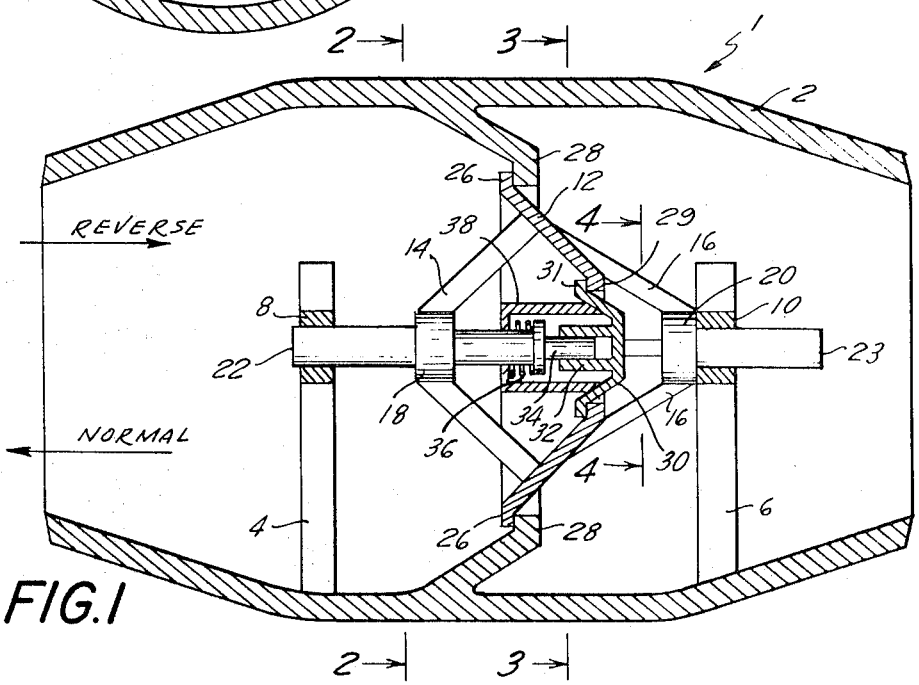
FIG. 1 is a cross-sectional view through the longitudinal axis of the valve, showing the valve in its closed position.

With reference to the drawing, and in particular FIG. 1, the check valve, generally indicated at 1, includes a substantially tubular body 2 which may be fabricated or cast. The body 2 has a plurality of axially spaced-apart ribs 4, 6 which have bearings 8, 10 respectively, centrally retained in axial alignment with each other and also concentric with the longitudinal axis of body 2. The ribs 4, 6 are equispaced around the inner periphery of the body 2 and are integral therewith to thereby insure proper axial alignment of bearings 8, 10.

A primary closure means consisting of a truncated conical member 12 has rigidly connected ribs 14, 16 to support said member, projecting from each side thereof toward the axis of conical member 12, as clearly shown in FIG. 1. The ribs 14, 16 extend to and are integrated with axially aligned shafts 22, 24, respectively, forming hubs 18, 20 on which they are positioned. The said shafts, ribs and closure means forming an integral assembly whereby shafts 22, 24 are journaled in bearings 8, 10, respectively, and the assembly is free to rotate and move axially, as explained hereinafter.

The primary closure means 12 has a depending flange portion 26 extending from its base which is adapted to seat against fixed seat 28. Seat 28 extends radially inward of the body 2, is transverse thereto and integral therewith, as shown in FIG. 1. The cooperation of the flanged portion 26 and seat 28 forms a seal between the two said members to thereby restrict the flow of fluid therethrough.

The truncated portion of the primary closure means 12 also has a depending flange portion 29 which forms a seat for secondary closure means 30. Closure means 30 is asymmetrically positioned with respect to closure means 12 and is also of conical, truncated configuration. The base portion of closure means 30 has an outwardly extending flange portion 31 which cooperates with flange 29 to thereby restrict the flow of fluid therethrough in a manner similar to flange 26 and seat 28. Secondary closure means 30 is adapted to be axially positioned on a reduced portion 34 of shaft 22 by tubular guide means 32 which extend from the truncated portion of closure means 30 to thereby guide the said closure means when it is displaced along shaft 22. Spring means 36 is positioned within a tubular housing 38 which surrounds guide means 32 in a manner so that the spring constantly urges the closure means 30 away from its seat 29. Thus, under normal flow conditions, the valve means 30 is kept open by the force of spring 36 and also the incoming fluid.

OPERATION

During normal flow, as indicated by the direction of the arrow in FIG. 1, the primary and secondary valve means, 12 and 30, respectively, are fully open and spring 36 is not compressed since the incoming fluid merely displaces the closure means 30 along the reduced shank portion 34 of shaft 22 to thereby open secondary closure means 30. Similarly, primary closure means 12 is subjected to the incoming, normal fluid pressure so that it is axially displaced. Its displacement also carries with it the entire assembly including shafts 22, 24, hubs 18, 20, ribs 14, 16 and secondary closure means 30. The entire assembly being supported on shafts 22, 24 which are journaled in bearings 8, 10, respectively. As best seen in FIG. 1, the hubs also serve as stop means for the axial travel of the valve assemblies as the hubs 18, 20 abut ribs 4, 6 respectively, when the assembly is moved to either axial extreme. The initiation of reverse flow, as shown by the arrow in FIG. 1, causes the primary valve means 12 to close while the resistance in compression spring 36 retards the closing of the secondary valve means 30 temporarily. Prior to the closing of the secondary valve means, the closing of the primary valve means throttles the incoming fluid velocity to a small value since flow can take place only through the opening created by the secondary valve means. The throttled flow then induces sufficient force to close the secondary valve means completely by overcoming the resistance of spring 36. Upon closing of the secondary means 30 there is a complete closing of the check valve and the reverse flow is stopped. By proper proportioning of the areas of the primary and secondary closure means, and the spring constant, the pressure rise following valve closure can be restricted to a very low value since the pressure rise is directly related to change in flow velocity at time of closure.

We claim:

1. A phased check valve for sequentially closing a plurality of closure means to prevent reverse flow therethrough comprising:
   a. a tubular valve body;
   b. a fixed valve seat having an opening therethrough positioned transversely within said body;
   c. a primary closure means positioned in said opening and mounted for movement relative to said seat and adapted to restrict the flow of fluid therebetween, said means having an opening therethrough;
   d. a secondary closure means positioned in said primary closure means opening and mounted for movement relative to said primary closure means to restrict the flow of fluid therebetween;
   e. a shaft positioned on each side of said primary closure means, said shafts being axially aligned;
   f. means to support said primary closure means on said shafts;
   g. spaced-apart support means in said body adapted to receive said shafts and closure means for movement between a first and second position, said first position corresponding to an open position permitting normal flow through the valve and said second position corresponding to a closed position initiated by reverse flow through the valve to thereby sequentially close said primary closure means to throttle the reverse flow and subsequently close said secondary closure means to prevent reverse flow.

2. A phased check valve as defined in claim 1 and further including means to retard closing of said secondary closure means, said secondary closure means positioned on one of said shafts for axial movement relative to said primary closure means.

3. A phased check valve as defined in claim 2 wherein said primary closure means is of truncated cone configuration having a base portion forming a seal with said fixed valve seat, and, a truncated portion forming the seat portion for said secondary closure means.

4. A phased check valve as defined in claim 3 wherein said means to support said primary closure means comprises a plurality of ribs integral with and extending from said primary closure means to said shafts, said ribs integrated with said shafts forming hubs, said hubs acting as stop means for the axial movement of the assembly.

5. A phased check valve as defined in claim 4 wherein said means to retard closing of said secondary closure means comprises a spring normally urging said secondary closure means away from said primary closure means.

6. A phased check valve as defined in claim 5 wherein said secondary closure means is of conical configuration having a base portion forming a seal with said opening in said primary closure means.

7. A phased check valve as defined in claim 6 and further including flange portions extending from each of said base portions and said seat portions, said flange portions adapted to overlap their respective seat portions.

8. A phased check valve for sequentially closing a plurality of closure means to prevent reverse flow therethrough comprising
   a. a tubular valve body;
   b. spaced-apart support means positioned in said body;
   c. a shaft positioned in each of said support means for axial movement;
   d. a fixed valve seat having an opening therethrough positioned transversely within said body between said support means;
   e. a primary closure means positioned between said shafts and in said opening and mounted for movement relative to said seat adapted to restrict the flow of fluid therebetween, said means having an opening therethrough;
   f. means to support said primary closure means on said shafts;
   g. a secondary closure means positioned in said primary closure means opening and mounted for movement relative to said primary closure means to restrict the flow of fluid therebetween, said primary and secondary closure means adapted for axial movement between said first position permitting normal flow through the valve and said second position preventing reverse flow by sequentially closing said primary closure means to thereby throttle the reverse flow and subsequently closing said secondary closure means to prevent reverse flow through the valve.

9. A phased check valve as defined in claim 8 wherein said shafts and said closure means lie on a common axis.

10. A phased check valve as defined in claim 9 and further including means to retard closing of said secondary closure, and wherein each of said closure means is of conical configuration.

11. A phased check valve as defined in claim 10 wherein said means to support said primary closure means includes a plurality of ribs integral with and extending from said shafts forming hubs, said hubs acting as stop means for the axial movement of said shafts.

12. A phased check valve as defined in claim 10 wherein said means to retard closing of said secondary closure means includes a spring normally urging said secondary closure means away from said primary closure means.

* * * * *